(12) United States Patent
Xiao et al.

(10) Patent No.: US 10,509,689 B2
(45) Date of Patent: Dec. 17, 2019

(54) METHOD FOR PROCESSING APPLICATION AND TERMINAL

(71) Applicant: BEIJING KINGSOFT INTERNET SECURITY SOFTWARE CO., LTD., Beijing (CN)

(72) Inventors: Chao Xiao, Beijing (CN); Jianxun Fu, Beijing (CN); Haiying Yang, Beijing (CN); Jialin Xiong, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 118 days.

(21) Appl. No.: 15/515,433

(22) PCT Filed: Sep. 1, 2015

(86) PCT No.: PCT/CN2015/088797
§ 371 (c)(1),
(2) Date: Mar. 29, 2017

(87) PCT Pub. No.: WO2016/050129
PCT Pub. Date: Apr. 7, 2016

(65) Prior Publication Data
US 2017/0220395 A1    Aug. 3, 2017

(30) Foreign Application Priority Data
Sep. 30, 2014    (CN) .......................... 2014 1 0522716

(51) Int. Cl.
*G06F 9/50* (2006.01)
*G06F 9/48* (2006.01)
*G06F 11/30* (2006.01)

(52) U.S. Cl.
CPC .......... *G06F 9/5094* (2013.01); *G06F 9/4893* (2013.01); *G06F 11/3024* (2013.01); *G06F 11/3058* (2013.01)

(58) Field of Classification Search
CPC ..................................................... G06F 9/5094
See application file for complete search history.

(56) References Cited

U.S. PATENT DOCUMENTS

| 2006/0218279 A1* | 9/2006 | Yamaguchi | ......... H04L 67/1008 709/226 |
| 2008/0034232 A1* | 2/2008 | Rangarajan | ............. G06F 1/206 713/300 |

(Continued)

FOREIGN PATENT DOCUMENTS

| CN | 102141942 A | 8/2011 |
| CN | 102946486 A | 2/2013 |

(Continued)

OTHER PUBLICATIONS

English translation of the Written Opinion of the International Searching Authority dated Dec. 16, 2015 for corresponding International Application No. PCT/CN2015/088797, filed Sep. 1, 2015.

(Continued)

*Primary Examiner* — Sisley N Kim
(74) *Attorney, Agent, or Firm* — David D. Brush; Westman, Champlin & Koehler, P.A.

(57) ABSTRACT

The present disclosure provides a terminal and a method for processing an application. The method includes: monitoring a temperature change state of a CPU; searching for an APP with a first CPU occupancy rate exceeding a corresponding normal numerical range if it is monitored that a second CPU occupancy rate is also in an increase state upon monitoring that temperature of the CPU is in an increase state; determining the APP as an APP that causes a temperature increase of the CPU; and stopping using the APP that causes the (Continued)

temperature increase of the CPU. According to the method, the influence on the terminal from an APP that causes the temperature increase of the CPU is reduced and the condition that the CPU of the terminal is overheated is avoided.

18 Claims, 6 Drawing Sheets

(56) References Cited

U.S. PATENT DOCUMENTS

| | | | | |
|---|---|---|---|---|
| 2012/0310564 | A1* | 12/2012 | Yamamoto | G01R 31/36 702/63 |
| 2013/0030764 | A1* | 1/2013 | Chatterjee | G06F 11/3409 702/182 |
| 2014/0047256 | A1* | 2/2014 | Li | G06F 1/3287 713/323 |
| 2014/0188977 | A1* | 7/2014 | Song | H04L 67/10 709/203 |
| 2015/0058867 | A1 | 2/2015 | Zhou | |

FOREIGN PATENT DOCUMENTS

| | | | | |
|---|---|---|---|---|
| CN | 103019842 | A | 4/2013 | |
| CN | 104267995 | A | 1/2015 | |
| WO | WO2014/019471 | * | 7/2013 | |
| WO | WO-2014019471 | A1 * | 2/2014 | .......... G06F 11/3409 |

OTHER PUBLICATIONS

Chinese Office Action dated Jan. 22, 2017 for corresponding Chinese Application No. 201410522716.8.

International Search Report dated Nov. 26, 2015 for corresponding International Application No. PCT/CN2015/088797, filed Sep. 1, 2015.

Written Opinion of the International Searching Authority dated Nov. 26, 2015 for corresponding International Application No. PCT/CN2015/088797, filed Sep. 1, 2015.

English translation of the Chinese Office Action dated Jan. 22, 2017 for corresponding Chinese Application No. 201410522716.8.

\* cited by examiner

METHOD FOR PROCESSING APPLICATION AND TERMINAL

CROSS-REFERENCE TO RELATED APPLICATIONS

This application is a Section 371 U.S. National Phase Application of International Application No. PCT/CN2015/088797, filed Sep. 1, 2015, which published as WO 2016/050129 A1 on Apr. 7, 2016, not in English, and claims a priority to Chinese Patent Application No. 201410522716.8, filed on Sep. 30, 2014, by BEIJING KINGSOFT INTERNET SECURITY SOFTWARE CO., LTD., with the title "METHOD AND DEVICE FOR PROCESSING APPLICATION AND TERMINAL", the entire contents of which are incorporated herein by reference.

FIELD

The present disclosure relates to field of terminal technology, and more particularly to a method and a device for processing an application and a terminal.

BACKGROUND

With the continuous development of mobile communication technology, an increasing number of applications (APP for short) appear in a mobile terminal (such as a smart phone) so as to satisfy demands of people's daily work and life. Resources of a central processing unit (CPU for short) in the smart phone may be consumed by each APP when the APP is running. Further, the system resources consumed in the smart phone vary with scenarios (such as a network connection state or a network disconnection state).

At present, a CPU occupancy rate of each APP running in a system of the mobile terminal may be calculated. However, it may be not determined whether the CPU occupancy rate of each APP is in a corresponding normal numerical range thereof. Typically, an APP with the CPU occupancy rate exceeding the corresponding normal numerical range may occupy a plurality of resources of the CPU while running, which not only may effect running efficiency of the terminal, but also may result in increasing temperature of the CPU of the mobile terminal, such that the mobile terminal may generate heat to reach a degree of holding difficultly, which makes poor user experience.

SUMMARY

Embodiments of the present disclosure provide a method for processing an application. The method includes: monitoring a temperature change state of a CPU; searching for an APP with a first CPU occupancy rate exceeding a corresponding normal numerical range if it is monitored that a second CPU occupancy rate is also in an increase state upon monitoring that temperature of the CPU is in an increase state, and determining the APP as an APP that causes a temperature increase of the CPU, and stopping using the APP that causes the temperature increase of the CPU.

Embodiments of the present disclosure provide a terminal. The terminal includes: a housing, a processor, a memory, a circuit board and a power circuit. The circuit board is arranged inside a space enclosed by the housing; the processor and the memory are disposed on the circuit board; the power circuit is configured to provide power for individual circuit or component; the memory is configured to store an executable program code; and the processor, by reading the executable program code stored in the memory, is configured to run a program corresponding to the executable the program code, so as to perform: monitoring a temperature change state of a CPU; searching for an APP with a first CPU occupancy rate exceeding a corresponding normal numerical range if it is monitored that a second CPU occupancy rate is also in an increase state upon monitoring that temperature of the CPU is in an increase state; determining the APP as an APP that causes a temperature increase of the CPU; and stopping using the APP that causes the temperature increase of the CPU.

Embodiments of the present disclosure provide a non-transitory computer storage medium. The non-transitory computer storage medium is configured to store an application, in which the application is causes to perform: monitoring a temperature change state of a CPU; searching for an APP with a first CPU occupancy rate exceeding a corresponding normal numerical range if it is monitored that a second CPU occupancy rate is also in an increase state upon monitoring that temperature of the CPU is in an increase state; determining the APP as an APP that causes a temperature increase of the CPU; and stopping using the APP that causes the temperature increase of the CPU.

Additional aspects and advantages of embodiments of present disclosure will be given in part in the following descriptions, become apparent in part from the following descriptions, or be learned from the practice of the embodiments of the present disclosure.

DETAILED DESCRIPTION

Figure 1:
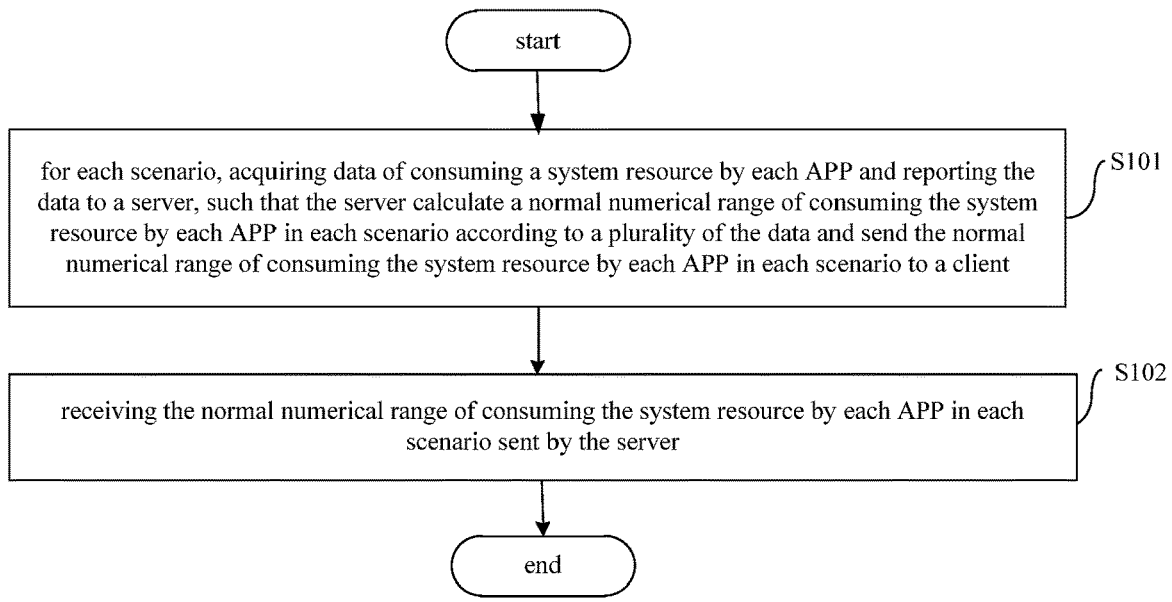
FIG. 1 is a flow chart of a method for acquiring a system resource consumed by an application according to an embodiment of the present disclosure.

Descriptions of embodiments of the present disclosure will be made in detail and examples of embodiments will be shown in accompanying drawings, in which the same or similar elements and the elements having same or similar functions are denoted by like reference numerals throughout the descriptions. The embodiments described herein with referring to accompanying drawings are exemplary and are intended to illustrate the present disclosure, which are not construed to limit the present disclosure.

A method, a device and a terminal for processing an application according to embodiments of the present disclosure will be described with referring to accompanying drawings as follows.

FIG. 1 is a flow chart of a method for acquiring a system resource consumed by an application according to an embodiment of the present disclosure. As shown in FIG. 1, the method includes followings.

At S101, for each scenario, data of consuming a system resource by each application (APP for short) may be acquired and may be reported to a server, such that the server may calculate a normal numerical range of consuming the system resource by each APP in each scenario according to a plurality of the data and may return the normal numerical range of consuming the system resource by each APP in each scenario to a client.

In the embodiment, the scenario may include an opened screen or a locked screen, and a network connection state or a network disconnection state, and the like of a terminal installed with the APP, which is not limited in the embodiment. The client may be disposed on hardware devices (such as a personal computer (PC), a mobile phone, a panel computer and the like) with various operating systems.

For example, under the network connection state, the terminal installed with the client may acquire the data of consuming the system resource by each APP running in the terminal system and may report the data to the server. The server may receive the data of consuming the system resource by each APP under the network connection state from the client and may acquire the normal numerical range of consuming the system resource by each APP under the network connection state from a pre-established database. The system resource may include, but be not limited to, a center processing unit (CPU for short). The system resource may also include one or more of a memory, an Input/Output (I/O for short), a network resource and the like. The pre-established database may include the normal numerical range of consuming each system resource by each version of each APP in each scenario. The normal numerical ranges of consuming the system resources by the APPs stored in the database are average ranges of consuming the system resources, which are analyzed by the server based on a plurality of terminals.

For example, the server may receive the data of consuming the memory, the CPU, the I/O and the network resource by 15 APPs under the network connection state from the client. The server may acquire the normal numerical range of consuming the system resource by each APP under the network connection state from the per-established database according to identifier information of each APP such as a package name or a package signature, and then may return the normal numerical range of consuming the system resource by each APP under the network connection state to the client.

The process that the server pre-establishes the database including the normal numerical range of consuming the system resource by each APP in each scenario will be described as follows.

Specifically, for each scenario, the server may acquire the data of consuming the memory, the CPU, the I/O and the network resource by each APP in each scenario from the plurality of clients, and may set a weight for each kind of the system resource based on each scenario, and also may calculate the acquired data based on the weight so as to acquire the normal numerical ranges of consuming the memory, the CPU, the I/O and the network resource by each APP in each scenario in the client. Furthermore, the server may calculate the normal numerical range of consuming the system resource by each version of each APP in each scenario according to huge data, and may store the normal numerical ranges of consuming the memory, the CPU, the I/O and the network resource by each version of each APP in each scenario into the database.

For example, the server receives CPU occupancy rates of the APP (such as the CM Browser, a mobile browser developed by Cheetah Mobile) sent by 1000 terminals under the network connection state, in which CPU occupancy rates of the CM Browser sent by 300 terminals under the network connection state are in the range of 3%-7%, CPU occupancy rates of the CM Browser sent by 300 terminals under the network connection state are in the range of 4%-8%, CPU occupancy rates of the CM Browser sent by 300 terminals under the network connection state are in the range of 4%-8%, and CPU occupancy rates of the CM Browser sent by 100 terminals under the network connection state are in the range of 80%-90%. Therefore, the server may determine that the normal numerical range of the CPU occupancy rate of the CM Browser is 3%-8% according to the acquired 1000 CPU occupancy rates of the CM Browser. It is to be seen that, the server may acquire the normal numerical range of the CPU occupancy rate based on a large data statistics manner, which may ignore differences of the CPU occupancy rates reported by different clients in the practical applications.

In the embodiment, the normal numerical range of consuming the system resource by each APP, stored in the server, is calculated based on the large data statistics manner, which may ignore the differences of the data of consuming the system resource by each APP from different clients in the practical applications. For example, a terminal may report the data of consuming the system resource in logging in WeChat and another terminal may report the data of consuming the system resource without logging in WeChat. The normal numerical range of the system resource restored in the database is shown in Table 1.

TABLE 1

| the normal numerical range of the system resource restored in the database | | | | | | |
|---|---|---|---|---|---|---|
| scenario name | identifier information of APP | version information | CPU | memory | network resource | I/O |
| scenario 1 | APP1 | 1 | 10%~12% | 5 Mb~6 Mb | 2.5 Mb~3 Mb | 12 kb~20 kb |
| scenario 1 | APP1 | 2 | 12%~15% | 4 Mb~8 Mb | 2 Mb~2.5 Mb | 22 kb~25 kb |
| ... | ... | ... | ... | ... | ... | ... |
| scenario 2 | APP1 | 1 | 14%~15% | 6 Mb~7 Mb | 2 Mb~2.5 Mb | 10 kb~15 kb |
| scenario 2 | APP1 | 2 | 16%~18% | 5 Mb~9 Mb | 2.5 Mb~3 Mb | 20 kb~225 kb |
| ... | ... | ... | ... | ... | ... | ... |

It is to be illustrated that, the normal numerical range of the system resource stored in the database shown in the Table 1 is merely an example, and the actual data should prevail in the practical applications.

At S102, the normal numerical range of consuming the system resource by each APP in each scenario, returned by the server, may be received.

Specifically, the client may receive the normal numerical range of consuming the system resource by each version of each APP in each scenario from the server, and may acquire the data of consuming the memory, the CPU, the I/O and the network resource by each APP installed on the client in a specific scenario (such as the network connection state), and also may determine whether the memory, the CPU, the I/O and the network resource consumed by each APP are in a corresponding respective normal numerical range respectively. If any one of the memory, the CPU, the I/O and the network resource consumed by each APP exceeds the corresponding normal numerical range, it is determined that an abnormality occurs in the corresponding APP, i.e., the current scenario may be unsuitable for the APP to run. After determining that the abnormality occurs in the APP, the client may display a prompt message such that a user may process the abnormal APP according to the prompt message.

For example, under the network connection state, if the memory consumed by APP1 is 2 Mb, the CPU occupancy rate of APP1 is 5%, the I/O consumed by APP1 is 1 Mb and the network resource (i.e. downloading or uploading) consumed by APP1 in a minute is 1 Mb, and for APP1, the normal numerical range of the memory received by the client from the server is 2.5 Mb-3.5 Mb, the normal numerical range of the CPU occupancy rate received by the client from the server is 4%-8%, the normal numerical range of the I/O received by the client from the server is 0.8 Mb-1.5 Mb and the normal numerical range of the network resource received by the client from the server is 0.5 Mb-1.2 Mb, by comparison, it is to be seen that, the memory consumed by the APP1 is not in the corresponding normal numerical range, i.e. the memory of the APP1 is abnormal. That is to say, a current running environment of the terminal is unsuitable for APP1 to run. After determining that the APP1 is abnormal, the client may prompt the user that the memory of the APP1 is abnormal, and then the user may process the APP1 according to the prompt message.

The method embodiment for acquiring the system resource consumed by the application, for each scenario, may acquire the data of consuming the system resource by each application, and may report the data to the server such that the server may calculate the normal numerical range of consuming the system resource by each APP in each scenario according to the plurality of the data and may return the normal numerical range of consuming the system resource by each APP in each scenario to the client, and also may receive the normal numerical range of consuming the system resource by each APP in each scenario from the server; thereby precisely acquiring the normal numerical ranges of consuming the system resource by each APP in various scenarios so as to prompt the user to perform associated processing on the APP if the system resource consumed by the APP is not in the corresponding normal numerical range in different scenarios.

Figure 2:
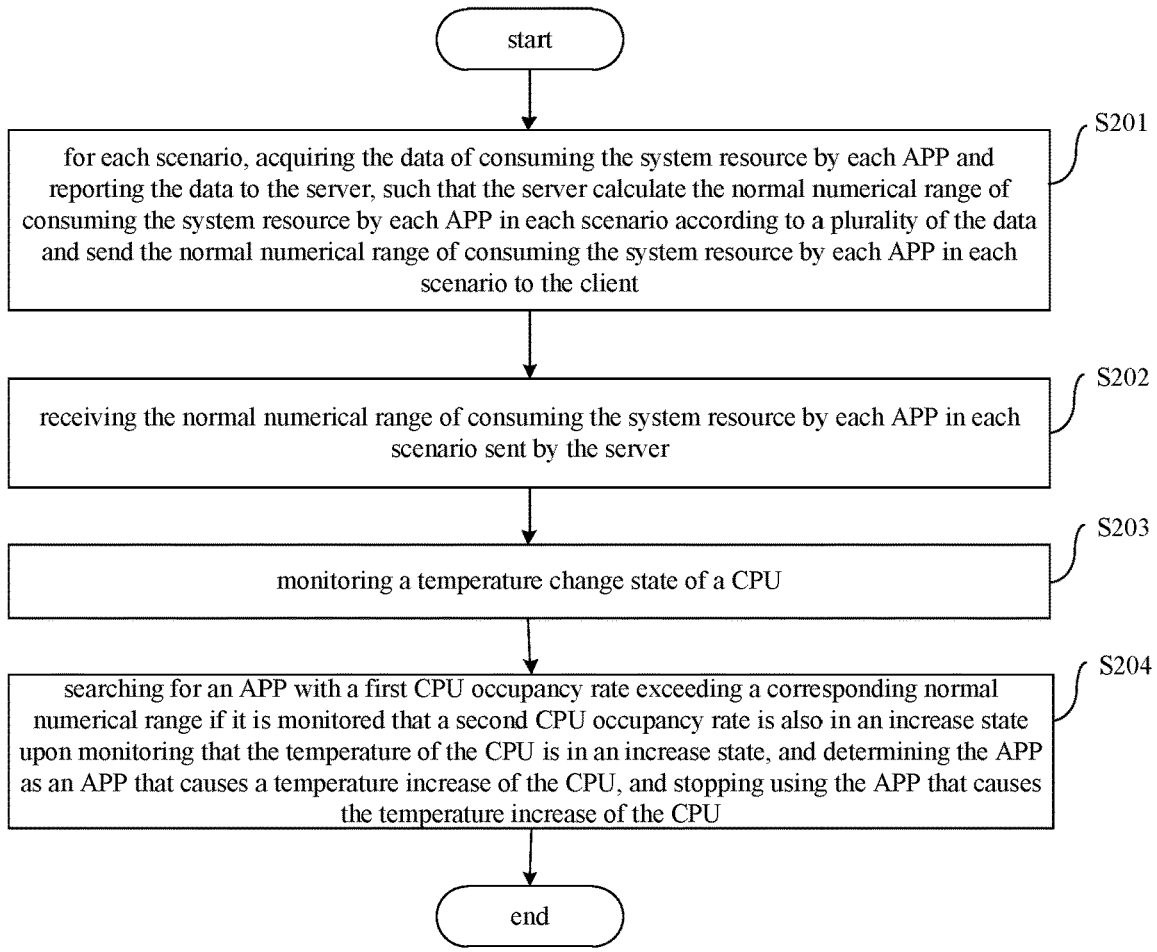
FIG. 2 is a flow chart of a method for processing an application according to an embodiment of the present disclosure.

FIG. 2 is a flow chart of a method for processing an application according to an embodiment of the present disclosure. As shown in FIG. 2, the method includes followings.

At S201, for each scenario, the data of consuming the system resource by each APP is acquired and is reported to the server, such that the server may calculate the normal numerical range of consuming the system resource by each APP in each scenario according to the plurality of the data and may return the normal numerical range of consuming the system resource by each APP in each scenario to the client.

In the embodiment, the scenario may include an opened screen or a locked screen, and a network connection state or a network disconnection state and the like of the terminal installed with the APP, and also may include an unlocked state or a non-unlocked state of the terminal installed with the APP, which is not limited in the embodiment. The client may be disposed on hardware devices (such as a personal computer (PC), a mobile phone, a panel computer and the like) with various operating systems. The system resource is a CPU herein.

At S202, the normal numerical range of consuming the system resource by each APP in each scenario, returned by the server, is received.

It is to be illustrated that, S202 is as same as S102, and explanations and illustrations of S102 are also suitable to S202, which are not described herein.

It is to be illustrated that, S201 and S202 are alternative.

At S203, a temperature change state of a CPU may be monitored.

Specifically, the temperature change state of the CPU in the system resources may be monitored via a temperature sensor after the normal numerical range of consuming the system resource by each APP in each scenario from the server is received. The temperature change state of the CPU is related to a usage condition of the CPU, i.e. the temperature change state of the CPU is related to the consumed resources of the CPU while the APP is running.

At S204, an APP with a first CPU occupancy rate exceeding the corresponding normal numerical range may be searched for if it is monitored that a second CPU occupancy rate is also in an increase state upon monitoring that the temperature of the CPU is in an increase state, the APP searched may be determined as an APP that causes a temperature increase of the CPU, and the APP that causes the temperature increase of the CPU may be stopped using.

In the embodiment, if the temperature of the CPU is monitored to remain in the increase state all the time via the temperature sensor and the second CPU occupancy rate (the CPU occupancy rate of the terminal) is monitored to remain in the increase state as well, the APP with the first CPU occupancy rate (the CPU occupancy rate of the APP) exceeding the corresponding normal numerical range may be searched for, and then the APP searched may be determined as the APP that causes the temperature increase of the CPU, and the prompt message for prompting the user to stop usage may be shown thereon, such that the user may close or remove the APP that causes the temperature increase of the CPU according to the prompt message. If a plurality of APPs with the first CPU occupancy rate exceeding the corresponding normal numerical range are searched for, the client may sequence the APPs with the abnormal first CPU occupancy rate according to a condition of an increase of the CPU temperature while each APP is running and may show a sequence result to the user. The user may quickly focus on the APP that causes the highest temperature increase of the CPU according to the sequence result and may stop using the APPs at the same time according to the prompt message, also may stop using the APP that causes the temperature increase of the CPU according to demands, and also may remove the APP that causes the temperature increase of the CPU according to the prompt message.

Additionally, in the embodiment, the APP that causes the temperature increase of the CPU may be automatically closed or removed after the APP searched is determined as the APP that causes the temperature increase of the CPU.

In the embodiment, if the temperature of the CPU is monitored to remain in the increase state all the time except for a transient jump at a certain time point via the temperature sensor, the temperature change state of the CPU is also in the increase state. The jump may include two conditions: a jump of the temperature from high to low or a jump of the temperature from low to high.

Figure 3A:
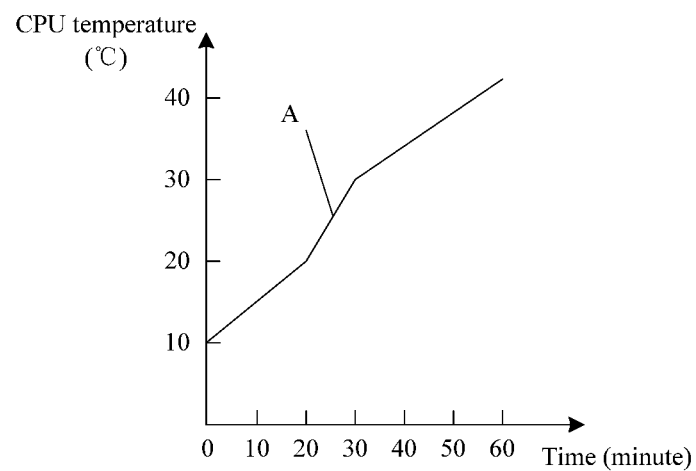
FIG. 3a is a first schematic diagram showing a temperature change of a CPU according to an embodiment of the present disclosure.

For example, the temperature of the CPU is monitored to remain in the increase state all the time via the temperature sensor. The temperature change of the CPU of the terminal detected via the temperature sensor is shown in FIG. 3a if the user brings the terminal from outdoor with relatively low temperature to indoor with relatively high temperature. It is to be seen from FIG. 3a that, the temperature of the CPU remain in the increase state again all the time after a transient rapid increase (such as A in FIG. 3). The transient rapid increase of the temperature of the CPU mainly results from that the temperature of the environment including the terminal is from a low level to a high level. The temperature of the CPU remains in the increase state again all the time after the transient temperature increase, which may illustrate that the APP that causes the temperature increase of the CPU exists in the terminal. Then, the APP with the first CPU occupancy rate exceeding the corresponding normal numerical range may be searched for, and the APP searched may be determined as the APP that causes the temperature increase of the CPU. The prompt message for prompting the user to stop usage may be shown on the terminal such that the user may stop using or remove the APP that causes the temperature increase of the CPU according to the prompt message, which may reduce an influence on the CPU from the APP that causes the temperature increase of the CPU, may lower the temperature of the CPU, and may avoid a case that the CPU is overheated.

Figure 3B:
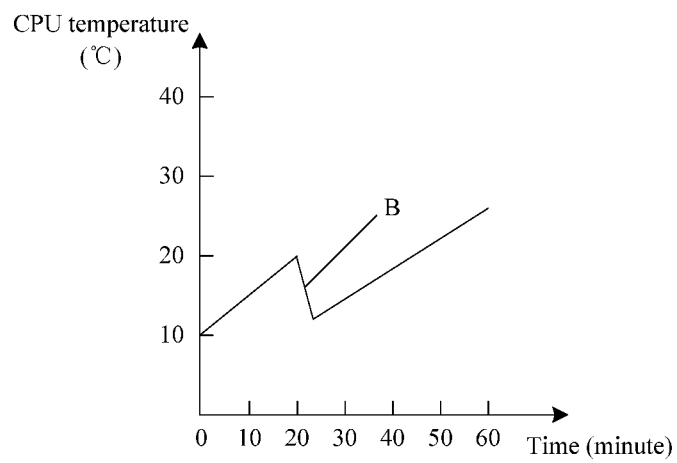
FIG. 3b is a second schematic diagram showing a temperature change of a CPU according to an embodiment of the present disclosure.

For another example, the temperature of the CPU is monitored to remain in the increase state all the time via the temperature sensor. The temperature change of the CPU of the terminal detected via the temperature sensor is shown in FIG. 3b if the user brings the terminal from outdoor with relatively high temperature to indoor with relatively low temperature. It may be seen from FIG. 3b that, after the user brings the terminal from outdoor with relatively high temperature to indoor with relatively low temperature, the temperature of the CPU remains in the increase state again all the time after a transient rapid decline (such as B in FIG. 3b). The transient rapid decline of the temperature of the CPU results from that the temperature of the environment including the terminal is from a high level to a low level. The temperature of the CPU remains in the increase state again all the time after the transient rapid temperature decline, which may illustrate that the APP that causes the temperature increase of the CPU exists in the terminal. Then the APP with the first CPU occupancy rate exceeding the corresponding normal numerical range may be searched for and the APP searched may be determined as the APP that causes the temperature increase of the CPU. The prompt message for prompting the user to stop usage may be shown on the terminal such that the user may stop using or remove the APP that causes the temperature increase of the CPU according to the prompt message, which may reduce an influence on the CPU from the APP that causes the temperature increase of the CPU, may lower the temperature of the CPU, and may avoid a case that the CPU is overheated, thereby improving the experience of using the terminal by the user.

The method for processing the application according to the embodiment, may monitor the temperature change of the CPU, may search for the APP with the first CPU occupancy rate exceeding the corresponding normal numerical range if it is monitored that the second CPU occupancy rate is also in the increase state upon monitoring that the temperature of the CPU is in the increase state, may determine the APP searched as the APP that causes the temperature increase of the CPU, and may stop using the APP that causes the temperature increase of the CPU, thereby reducing the influence on the terminal from the APP that causes the temperature increase of the CPU and avoiding a case that the CPU of the terminal is overheated.

Figure 4:
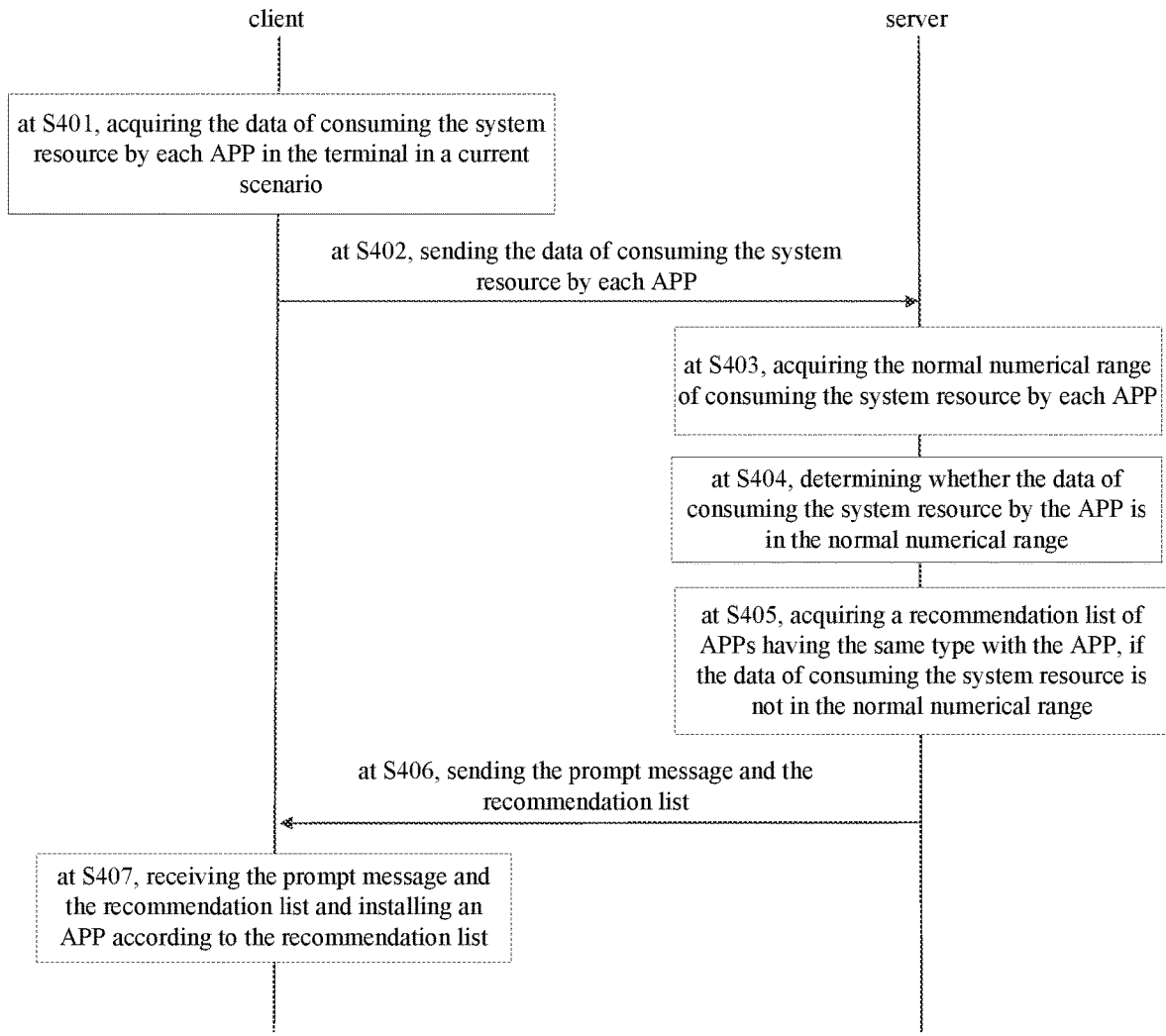
FIG. 4 is a flow chart of a method for recommending an application according to an embodiment of the present disclosure.

FIG. 4 is a flow chart of a method for recommending an application according to an embodiment of the present disclosure. As shown in FIG. 4, the method includes followings.

At S401, for a current scenario, the client may acquire the data of consuming the system resource by each APP in the terminal installed with the client.

In the embodiment, the scenario may include an opened screen or a locked screen, and a network connection state or a network disconnection state and the like of the terminal installed with the APP, which is not limited in the embodiment. The client may be disposed on hardware devices (such as a personal computer (PC), a mobile phone, a panel computer and the like) with various operating systems.

Specifically, the data of consuming the memory, the CPU, the I/O and the network resource by each APP running in the terminal in the current scenario (such as the network connection state), may be acquired.

At S402, the client may send the data carrying the system resource consumed by each APP in the current scenario to the server.

At S403, the server may receive the data sent by the client and may acquire the normal numerical range of consuming the system resource by each APP in the terminal installed with the client according to the data.

Specifically, the server may receive the data sent by the client and may acquire the normal numerical range of consuming the system resource by each APP in the terminal installed with the client in the current scenario from the pre-established database according to the data. The normal numerical range stored in the local pre-established database is shown in Table 1.

It is to be illustrated that, the normal numerical range of consuming the system resource by each APP stored in the database, may be acquired, via the server by setting the weight for each kind of the system resource based on the current scenario and by performing a calculation based on the corresponding weight. Furthermore, the normal numerical range of consuming the system resource by each APP stored in the database, may be acquired, via the server by acquiring the data of consuming each kind of the system resource by each APP in the current scenario from a plurality of terminals based on the current scenario, and by setting the weight for each kind of the system resource according to the current scenario to calculate.

At S404, the server may determine whether an APP with the consumed system resource without the corresponding normal numerical range exists in the current scenario, according to the received data of consuming the system resource by each APP and the acquired normal numerical range of consuming the system resource by each APP.

At S405, the server may acquire a recommendation list of APPs having the same type with the APP according to the corresponding normal numerical range if determining that the APP with the consumed system resource without the corresponding normal numerical range exists in the current scenario.

For example, if determining that the current APP (such as QQ Music) with the consumed system resource (such as the CPU) without the corresponding normal numerical range exists in the current scenario, the server may acquire corresponding recommended APPs (such as XiaMi Music, NetEase Cloud Music and the like) having the same type with the current APP from the pre-established database according to the corresponding normal numerical range so as to generate the recommendation list including the recommended APPs.

For another example, if determining there are a plurality of APPs with the consumed system resource without the corresponding normal numerical range, such as the memory consumed by APP1 in the current scenario is not in the normal numerical range of the memory corresponding to APP1 and the CPU consumed by APP2 in the current scenario is not in the normal numerical range of the CPU corresponding to APP2, the server may acquire recommended APPs having the same type with APP1 from the database according to the normal numerical range of the memory of the APP1 and may acquire recommended APPs having the same type with APP2 from the database according to the normal numerical range of the CPU of the APP2, and also may generate a recommendation list including APPs recommended by APP1 and APP2.

At S406, the server may send the prompt message and the recommendation list to the client.

At S407, the client may receive the prompt message and the recommendation list returned by the server and may install an APP according to the recommendation list.

Specifically, the client may receive the prompt message returned by the server, and may remove an APP that is unsuitable to run in the current scenario according to the prompt message, and also may install an APP that is more suitable to run in the current scenario of the terminal installed with the client according to the recommendation list. As a result, all APPs running in the terminal installed with the client may be more suitable to the current scenario and the system resource consumed by the APP that is unsuitable to the current scenario of the terminal installed with the client may be reduced, thereby improving the running efficiency of the terminal system.

With the method for recommending the application according to the embodiment, for the current scenario, the client may acquire the data of consuming the system resource by each APP and may send the data to the server. The server may acquire the corresponding normal numerical range of consuming the system resource by each APP according to the received data and may determine whether the APP with the consumed system resource without the normal numerical range exists according to the received data of consuming the system resource by each APP and the corresponding normal numerical range. If this APP exists, the server may acquire the recommendation list for recommending the APPs having the same type according to the normal numerical range and may send the prompt message as well as the recommendation list to the client. The client may remove the APP that is unsuitable to the current scenario of the terminal installed with the client according to the prompt message and may install the APP that is more suitable to the current scenario of the terminal installed with the client. Therefore, the system resource consumed by the APP that is unsuitable to the current scenario of the terminal installed with the client may be reduced, thereby improving the running efficiency of the terminal system.

Figure 5:
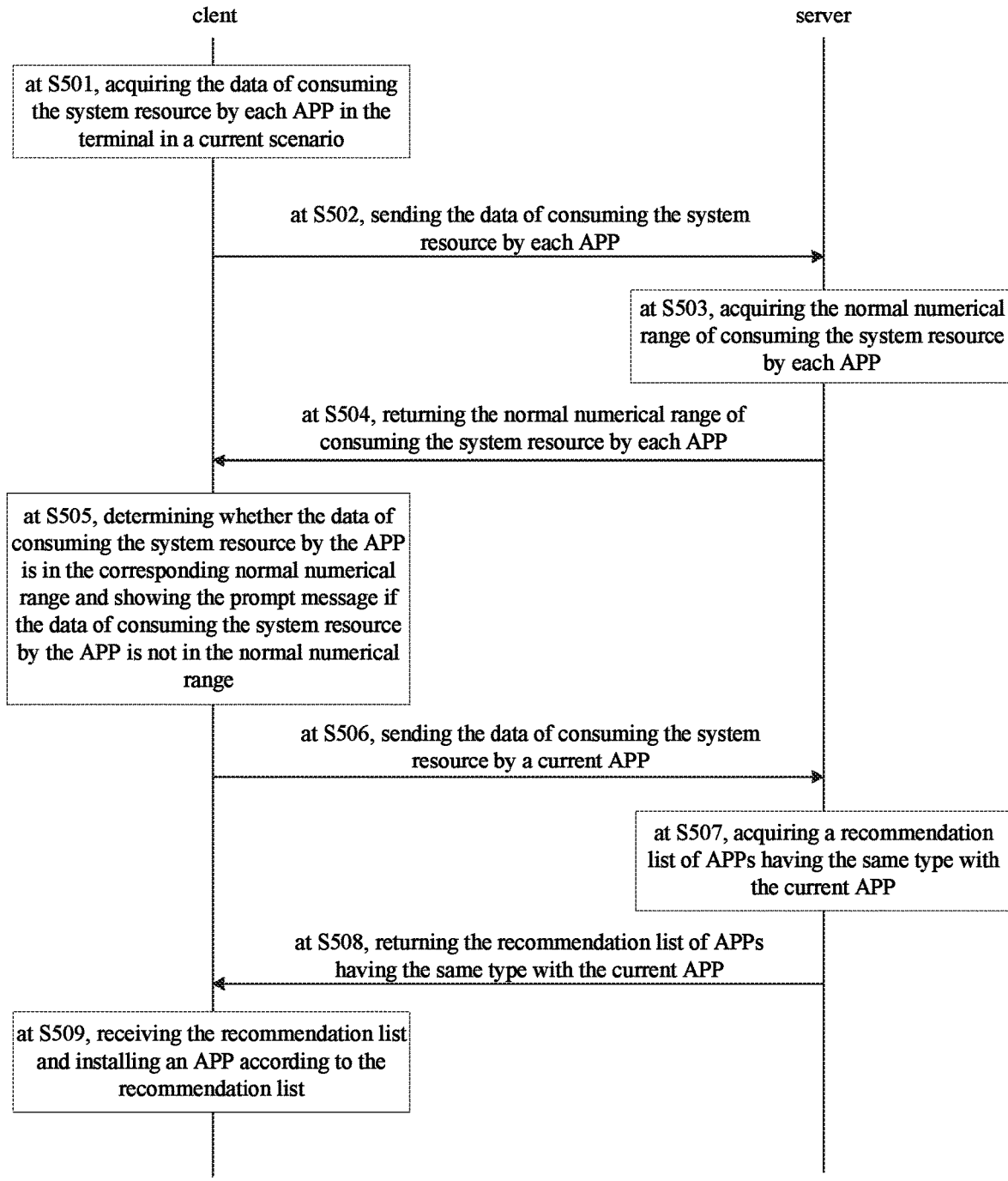
FIG. 5 is a flow chart of a method for recommending an application according to another embodiment of the present disclosure.

FIG. 5 is a flow chart of a method for recommending an application according to another embodiment of the present disclosure. As shown in FIG. 5, the method includes followings.

At S501, for a current scenario, the client may acquire the data of consuming the system resource by each APP in the terminal installed with the client.

In the embodiment, the scenario may include an opened screen or a locked screen, and a network connection state or a network disconnection state and the like of the terminal installed with the APP, which is not limited in the embodiment. The client may be disposed to on hardware devices (such as a personal computer (PC), a mobile phone, a panel computer and the like) with various operating systems.

Specifically, the data of consuming the memory, the CPU, the I/O and the network resource by each APP in the current scenario (such as the network connection state), may be acquired.

At S502, the client may send the data carrying the system resource consumed by each APP in the current scenario to the server.

At S503, the server may receive the data sent by the client and may acquire the normal numerical range of consuming the system resource by each APP in the terminal installed with the client according to the data.

Specifically, the server may receive the data sent by the client and may acquire the normal numerical range of consuming the system resource by each APP in the terminal installed with the client in the current scenario from the pre-established database according to the data. The normal numerical range stored in the local pre-established database is shown in Table 1, which is not described herein.

It is to be illustrated that, the normal numerical range of consuming the system resource by each APP stored in the database may be acquired, via the server by setting the weight for each system resource based on the current scenario and by performing a calculation based on the corresponding weight.

At S504, the server may return the normal numerical range of consuming the system resource by each APP to the client.

Specifically, the server may return the normal numerical range of consuming the system resource by each APP in the client in the current scenario to the client.

At S505, the client may receive the normal numerical range of consuming the system resource by each APP returned by the server and may determine whether the data of consuming the system resource by each APP is in the corresponding normal numerical range of consuming the system resource. If the data of consuming the system resource by each APP is in the corresponding normal numerical range, the data of consuming the system resource by each APP may be determined to be normal, otherwise, the data of consuming the system resource by each APP may be determined to be abnormal and the prompt message may be shown on the client.

Specifically, the client may receive the normal numerical range of consuming the system resource by each APP in the current scenario and may determine whether the data of consuming the system resource by the APP in the client is normal according to the received corresponding normal numerical range in the current scenario. If one or more data of the consumed memory, the consumed CPU, the consumed I/O and the consumed network resource are not in the corresponding normal numerical range, the corresponding data of consuming the system resource by the APP is abnormal. That is to say, in the current scenario, the corresponding APP is unsuitable to run in the terminal, and a corresponding prompt message is shown on the client such that the user may remove the APP that is unsuitable to the current scenario of the terminal according to the prompt message.

At S506, the client may send the data of consuming the system resource by a current APP in the current scenario to the server.

Specifically, while the prompt message is displayed, the client may send the data of consuming the system resource by the current APP in the current scenario to the server, such that the client may acquire other APPs having the same type, which are recommended by the server, when removing the APP that is unsuitable to the current scenario of the terminal.

At S507, the server may acquire a recommendation list of APPs having the same type with the current APP according to the corresponding normal numerical range if determining that the system resource consumed by the current APP in the current scenario is not in the corresponding normal numerical range.

For example, if the current APP is QQ Music, the server determines that the system resource consumed by QQ Music in the current scenario is not in the corresponding normal numerical range, the corresponding APPs having the same type, such as XiaMi Music, NetEase Cloud Music and the like, are acquired from the pre-established database according to the corresponding normal numerical range so as to generate the recommendation list including the recommended APPs.

At S508, the server may return the recommendation list of APPs having the same type with the current APP to the client.

At S509, the client may receive the recommendation list returned by the server and may install an APP that is suitable to run in the current scenario according to the recommendation list.

Specifically, the client may receive the recommendation list returned by the server and may select the APP that is suitable to run in the current scenario of the terminal installed with the client from the recommendation list to install. As a result, all APPs running in the terminal installed with the client are more suitable to the current scenario. Therefore, the terminal system resource consumed by the APP that is unsuitable to the current scenario of the terminal installed with the client may be reduced, thereby improving the running efficiency of the terminal system.

With the method for recommending the application according to the embodiment, for the current scenario, the client may acquire the data of consuming the system resource by each APP and may send the data to the server. The server may acquire the normal numerical range of consuming the system resource by each APP according to the received data and may return the normal numerical range of consuming the system resource by each APP to the client. The client may determine whether the corresponding data of consuming the system resource by an APP is in the normal numerical range according to the returned corresponding normal numerical range of consuming the system resource by each APP. If the APP exceeding the normal numerical range exists, the corresponding data of consuming the system resource by the APP is sent to the server, such that the server may determine the corresponding normal numerical range according to the data of consuming the system resource and may acquire the recommended APPs having the same type according to the determined normal numerical range and then may return the recommended APPs. The client may install the APP that is suitable to the current scenario of the terminal installed with the client according to the recommended APPs. Therefore, the terminal system resource consumed by the APP that is unsuitable to run in the current scenario of the terminal installed with the client may be reduced, thereby improving the running efficiency of the terminal system.

Figure 6:
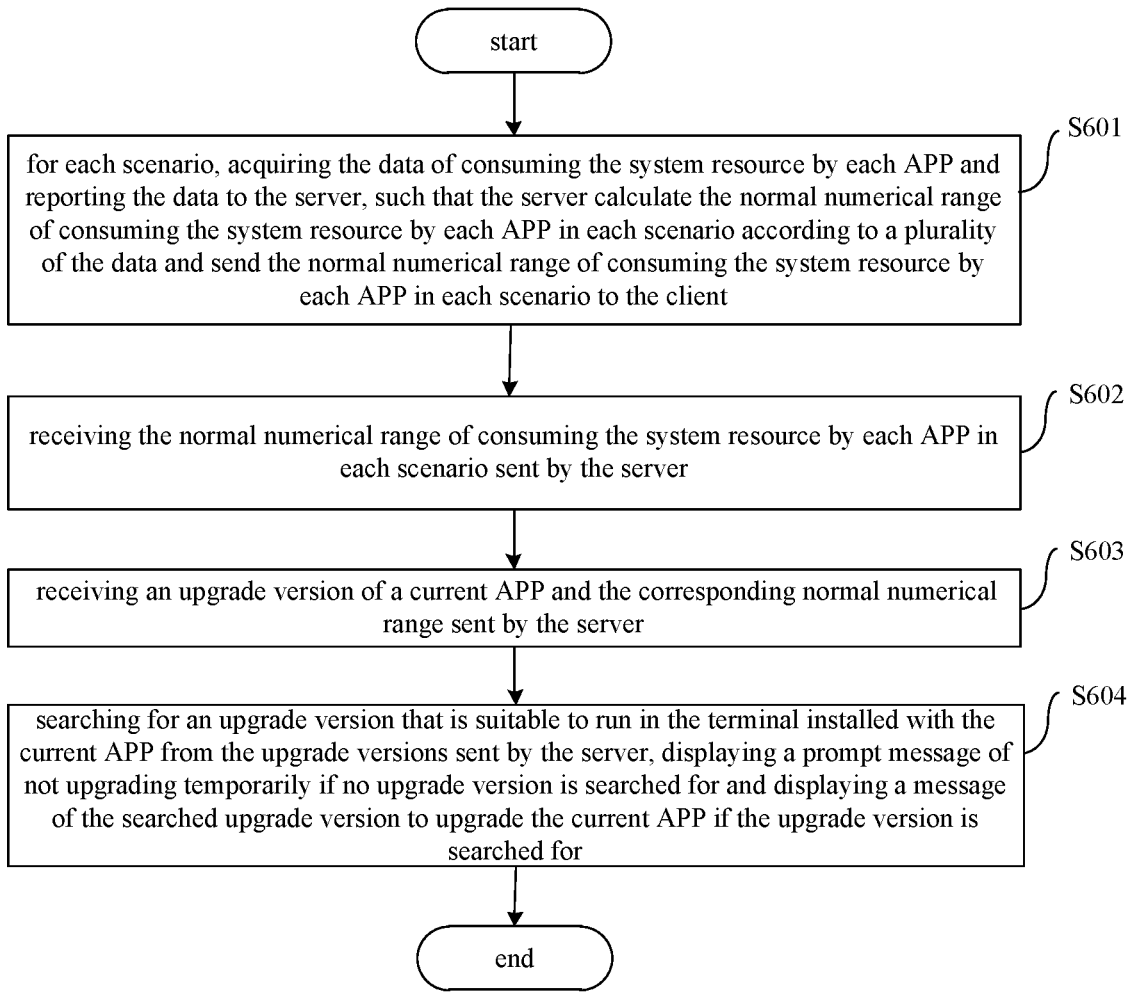
FIG. 6 is a flow chart of a method for upgrading an application according to an embodiment of the present disclosure.

FIG. 6 is a flow chart of a method for upgrading an application according to an embodiment of the present disclosure. As shown in FIG. 6, the method includes followings.

At S601, for each scenario, the data of consuming the system resource by each APP may be acquired and may be reported to the server, such that the server may calculate the normal numerical range of consuming the system resource by each APP in each scenario according to the plurality of the data and may return the normal numerical range of consuming the system resource by each APP in each scenario to the client.

In the embodiment, the scenario may include an opened screen or a locked screen, and a network connection state or a network disconnection state and the like of the terminal installed with the APP, which is not limited in the embodiment. The client may be disposed on hardware devices (such as a personal computer (PC), a mobile phone, a panel computer and the like) with various operating systems. The system resource may include one or more of the memory, the CPU, the I/O and the network resource.

At S602, the normal numerical range of consuming the system resource by each APP in each scenario, returned by the server, may be received.

It is to be illustrated that, S602 is as same as S102, and explanations and illustrations of S102 are also suitable for S602, which are not described herein.

Specifically, after the normal numerical range of consuming the system resource by each APP in each scenario returned by the server is received, and for each APP, if there is an upgrade version of the APP in the server, the method may further include followings.

At S603, the upgrade version of the current APP and the corresponding normal numerical range of consuming the system resource, sent by the server, may be received.

In the embodiment, according to the data of consuming the system resource by each APP sent by the client (the data may include not only one or more of the memory, the CPU, the I/O and the network resource consumed by each APP in the client, but also identifier information corresponding to each APP, such as a package name or a package signature), the server may automatically push the upgrade version to the client if determining the upgrade version corresponding to the APP exists, such that the user may upgrade the corresponding version of the APP in the terminal installed with the client based on the pushed upgrade version and corresponding normal numerical range of consuming the system resource. For example, if the current APP is the CM Browser, after sending the normal numerical range corresponding to the CM Browser to the client, and if monitoring there are two upgrade versions (such as an upgrade version 1 and an upgrade version 2), the server may acquire the normal numerical ranges corresponding to the upgrade versions of the CM Browser according to the upgrade version 1 and the upgrade version 2, and may return the upgrade packages of the upgrade versions corresponding to the cheetah browser and return the corresponding normal numerical ranges of consuming the system resource to the client.

At S604, an upgrade version that is suitable to run in the terminal installed with the current APP may be searched for from the upgrade versions sent by the server. A prompt message of not upgrading temporarily may be shown if no upgrade version is searched for, and a message of the searched upgrade version is shown so as to upgrade the current APP if the upgrade version is searched for.

Specifically, if there are a plurality of upgrade versions of the current APP sent by the server, the client may search for whether the respective normal numerical range corresponding to each of the plurality of upgrade versions is suitable to run in the terminal installed with the current APP. If no upgrade version is searched for, the prompt message of not upgrading temporarily is shown, for example, the prompt message may be "the upgrade version of the current APP is unsuitable to the current scenario, so suggest not upgrading"; if there are a plurality of upgrade versions of the current APP sent by the server, the client may search for the respective normal numerical range corresponding to each of the plurality of upgrade versions, and if there is an upgrade version that is suitable to run in the terminal installed with the client in the plurality of upgrade versions, the message of the searched upgrade version is shown such that the user may upgrade the current APP according to the message of the upgrade version.

For example, two upgrade versions of the CM Browser sent by the server are received by the client, which are an upgrade version1 and an upgrade version 2. If the normal numerical range of consuming the memory is 23 Mb-32 Mb and the normal numerical range of consuming the CPU is 20%-25% corresponding to the upgraded version 1, while the normal numerical range of consuming the memory is 30 Mb-32 Mb and the normal numerical range of consuming the CPU is 21%-26% corresponding to the upgraded version 2, the client determines that the upgrade version 1 is more suitable to run in the terminal installed with the client according to the hardware environment of the terminal installed the client and shows the prompt message such as "The upgrade version 1 occupies less memory and less CPU occupancy rate to suggest upgrading the CM Browser according to the upgrade version 1", and then the user may determine to upgrade the current version of the CM Browser according to the prompt message.

With the method for upgrading the application according to the embodiment, the client may acquire the data of consuming the system resource by each APP in the client and may send the data to the server. The server may acquire the normal numerical range of consuming the system resource by each APP according to the acquired data, and may return the upgrade version of the APP and the corresponding normal numerical range of consuming the system resource to the client after acquiring that the APP in the client has the upgrade version. The client may search for the upgrade version that is suitable to run in the terminal installed with the current APP from the upgrade versions sent by the server; if searching for no upgrade version, the client may show the prompt message of not upgrading temporality, if searching for the upgrade version, the client may show the message of the searched upgrade version so as to upgrade the current APP. The APP with the upgrade version that is suitable to run in the terminal may be intelligently provided while the normal numerical range of consuming the system resource by each APP is acquired precisely. Therefore, it is convenient for the user to upgrade the version of the APP in the terminal according to the prompt message.

In order to achieve the above embodiments, the present disclosure further provides a device for processing an application.

Figure 7:
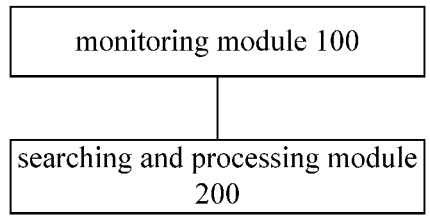
FIG. 7 is a schematic diagram of a device for processing an application according to an embodiment of the present disclosure.

FIG. 7 is a schematic diagram of a device for processing an application according to an embodiment of the present disclosure. As shown in FIG. 7, the device includes a monitoring module 100 and a searching and processing module 200.

The monitoring module 100 is configured to monitor a temperature change state of a CPU; the searching and processing module 200 is configured to search for an APP with a first CPU occupancy rate exceeding a corresponding normal numerical range if it is monitored that a second CPU occupancy rate is also in an increase state upon monitoring that temperature of the CPU is in an increase state, to determine the APP is an APP that causes a temperature increase of the CPU, and to stop using the APP that causes the temperature increase of the CPU.

The searching and processing module 200 is specifically configured to display a prompt message for stopping usage; and to receive an operation triggered by a user for closing or removing the APP that causes the temperature increase of the CPU according to the prompt message, and also to close or remove the APP that causes the temperature increase of the CPU according to the operation.

In addition, the searching and processing module 200 is further configured to automatically close or remove the APP that causes the temperature increase of the CPU.

The monitoring module 100 is specifically configured to monitor that the temperature of the CPU remain in the increase state all the time via a temperature sensor; or to monitor that the temperature of the CPU remain in the increase state all the time except for a transient jump at a certain time point via a temperature sensor. The jump may include two conditions: a jump of the temperature from high to low or a jump of the temperature from low to high.

Figure 8:
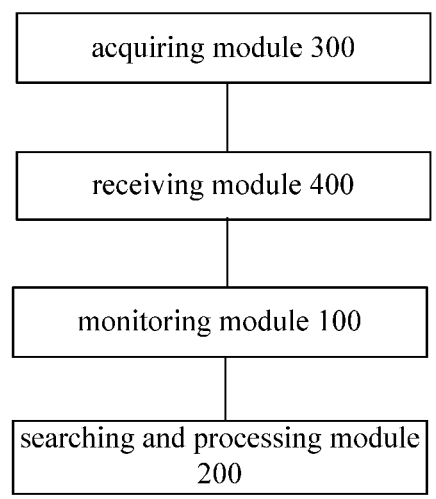
FIG. 8 is a schematic diagram of a device for processing an application according to another embodiment of the present disclosure.

As shown in FIG. 8, the device further includes an acquiring module 300 and a receiving module 400. The acquiring module 300 is configured to, for each scenario, acquire data of consuming a system resource by each APP and to report the data to a server, such that the server calculate a normal numerical range of consuming the system resource by each APP in each scenario according to a plurality of the data and send the normal numerical range of consuming the system resource by each APP in each scenario to a client; the receiving module 400 is configured to receive the normal numerical range of consuming the system resource by each APP in each scenario sent by the server.

The scenario may include an opened screen or a locked screen, and a network connection state or a network disconnection state and the like of a terminal installed with the APP. The system resource may include, but be not limited to, a CPU, and also may include a memory, an I/O, a network resource and the like. The normal numerical range of consuming the system resource by each APP in each scenario may be acquired, via the server by setting a weight for each system resource based on a current scenario and by performing a calculation based on the corresponding weight.

Specifically, after the acquiring module 300 acquires the data of consuming the system resource by each APP in each scenario and reports the data to the server, the server may receive the data reported by the terminal, and may set a weight for each system resource based on each scenario according to the acquired data of consuming the memory, the CPU, the I/O and the network resource by each APP from the plurality of other terminals in each scenario, and also may calculate the acquired data based on the corresponding weight to acquire the normal numerical ranges of consuming the memory, the CPU, the I/O and the network resource by each APP in the terminal in each scenario. Furthermore, the normal numerical range of consuming the system resource by each version of each APP in each scenario may be acquired.

The process of processing an APP via the device including the monitoring module 100, the searching and processing module 200, the acquiring module 300 and the receiving module 400, may be shown in FIG. 2, which is no described herein.

The device for processing the application according to embodiments of the present disclosure, may monitor the temperature change of the CPU via the monitoring module, may search for the APP with the first CPU occupancy rate exceeding the corresponding normal numerical range if it is monitored that the second CPU occupancy rate is also in the increase state upon monitoring that the temperature of the CPU is in the increase state via the searching and processing module, may determine the APP searched as the APP that causes the temperature increase of the CPU and may stop using the APP that causes the temperature increase of the CPU via the searching and processing module, thereby reducing an influence on the terminal from the APP that causes the temperature increase of the CPU and avoiding a case that the CPU of the terminal is overheated.

In order to achieve the above embodiments, the present disclosure further provides a terminal. The terminal includes a housing, a processor, a memory, a circuit board and a power circuit. The circuit board is arranged inside a space enclosed by the housing; the processor and the memory are disposed on the circuit board; the power circuit is configured to provide power for individual circuit or component; the memory is configured to store an executable program code; and the processor, by reading the executable program code stored in the memory, is configured to run a program corresponding to the executable the program code, so as to perform the followings.

At S201', for each scenario, data of consuming a system resource by each APP may be acquired and may be reported to a server, such that the server may calculate a normal numerical range of consuming the system resource by each APP in each scenario according to a plurality of the data and may return the normal numerical range of consuming the system resource by each APP in each scenario to a terminal.

In the embodiment, the scenario may include an opened screen or a locked screen, and a network connection state or a network disconnection state and the like of the terminal installed with the APP, which is not limited in the embodiment. The terminals may be hardware devices (such as a personal computer (PC), a mobile phone, a panel computer and the like) with various operating systems.

For example, under the network connection state, the data of consuming the system resource by each APP running in the terminal system may be acquired and may be reported to the server. The server may receive the data of consuming the system resource by each APP under the network connection state from the terminal and may acquire the normal numerical range of consuming the system resource by each APP under the network connection state from a pre-established database. The system resource may include, but be not limited to, a CPU. The system resource may also include one or more of a memory, an I/O, a network resource and the like. The pre-established database may include the normal numerical range of consuming each system resource by each version of each APP in each scenario. The normal numerical ranges of consuming the system resources by the APPs stored in the database are average ranges of consuming the system resources, which are analyzed by the server based on a plurality of terminals.

For example, the server may receive the data of consuming the memory, the CPU, the I/O and the network resource by 15 APPs under the network connection state from the terminal. The server may acquire the normal numerical range of consuming the system resource by each APP under the network connection state from the per-established database according to identifier information of each APP such as a package name or a package signature, and then may return the normal numerical range of consuming the system resource by each APP under the network connection state to the terminal.

The process that the server pre-establishes the database including the normal numerical range of consuming the system resource by each APP in each scenario will be described as follows.

Specifically, for each scenario, the server may acquire the data of consuming the memory, the CPU, the I/O and the network resource by each APP in each scenario from the plurality of terminals, and may set a weight for each kind of the system resource based on each scenario, and also may calculate the acquired data based on the weight so as to acquire the normal numerical ranges of consuming the memory, the CPU, the I/O and the network resource by each APP in each scenario in the terminal. Furthermore, the server may calculate the normal numerical range of consuming the system resource by each version of each APP in each scenario according to huge data, and may store the normal numerical ranges of consuming the memory, the CPU, the I/O and the network resource by each version of each APP in each scenario into the database.

For example, the server receives CPU occupancy rates of the APP (such as the CM Browser) sent by 1000 terminals under the network connection state, in which CPU occupancy rates of the CM Browser sent by 300 terminals under the network connection state are in the range of 3%-7%, CPU occupancy rates of the CM Browser sent by 300 terminals under the network connection state are in the range of 4%-8%, CPU occupancy rates of the CM Browser sent by 300 terminals under the network connection state are in the range of 4%-8%, and CPU occupancy rates of the CM Browser sent by 100 terminals under the network connection state are in the range of 80%-90%. Therefore, the server may determine that the normal numerical range of the CPU occupancy rate of the CM Browser is 3%-8% according to the acquired 1000 CPU occupancy rates of the CM Browser. It is to be seen that, the server may acquire the normal numerical range of the CPU occupancy rate based on a large data statistics manner, which may ignore differences of the CPU occupancy rates reported by different terminals in the practical applications.

In the embodiment, the normal numerical range of consuming the system resource by each APP, stored in the server, is calculated based on the large data statistics manner, which may ignore the differences of the data of consuming the system resource by each APP from different terminals in the practical applications. For example, a terminal may report the data of consuming the system resource in logging in WeChat and another terminal may report the data of consuming the system resource without logging in WeChat. The normal numerical range of the system resource restored in the database is shown in Table 1.

TABLE 1 the normal numerical range of the system resource restored in the database

| scenario name | identifier information of APP | version information | CPU | memory | network resource | I/O |
|---|---|---|---|---|---|---|
| scenario 1 | APP1 | 1 | 10%~12% | 5 Mb~6 Mb | 2.5 Mb~3 Mb | 12 kb~20 kb |
| scenario 1 | APP1 | 2 | 12%~15% | 4 Mb~8 Mb | 2 Mb~2.5 Mb | 22 kb~25 kb |
| ... | ... | ... | ... | ... | ... | ... |
| scenario 2 | APP1 | 1 | 14%~15% | 6 Mb~7 Mb | 2 Mb~2.5 Mb | 10 kb~15 kb |
| scenario 2 | APP1 | 2 | 16%~18% | 5 Mb~9 Mb | 2.5 Mb~3 Mb | 20 kb~225 kb |
| ... | ... | ... | ... | ... | ... | ... |

It is to be illustrated that, the normal numerical range of the system resource stored in the database shown in the Table 1 is merely an example, and the actual data should prevail in the practical applications.

At S202', the normal numerical range of consuming the system resource by each APP in each scenario, returned by the server, may be received.

Specifically, the normal numerical range of consuming the system resource by each version of each APP in each scenario from the server may be received, and the data of consuming the memory, the CPU, the I/O and the network resource by each APP installed on the terminal in a specific scenario (such as the network connection state) may be acquired, and also it is determined whether the memory, the CPU, the I/O and the network resource consumed by each APP are in a corresponding respective normal numerical range respectively. If any one of the memory, the CPU, the I/O and the network resource consumed by each APP exceeds the corresponding normal numerical range, it is determined that an abnormality occurs in the corresponding APP, i.e., the current scenario may be unsuitable for the APP to run. After determining that the abnormality occurs in the APP, the terminal may display a prompt message such that a user may process the abnormal APP according to the prompt message.

For example, under the network connection state, if the memory consumed by APP1 is 2 Mb, the CPU occupancy rate of APP1 is 5%, the I/O consumed by APP1 is 1 Mb and the network resource (i.e. downloading or uploading) consumed by APP1 in a minute is 1 Mb, and for APP1, the normal numerical range of the memory received by the terminal from the server is 2.5 Mb-3.5 Mb, the normal numerical range of the CPU occupancy rate received by the terminal from the server is 4%-8%, the normal numerical range of the I/O received by the terminal from the server is 0.8 Mb-1.5 Mb and the normal numerical range of the network resource received by the terminal from the server is 0.5 Mb-1.2 Mb, by comparison, it is to be seen that, the memory consumed by the APP1 is not in the corresponding normal numerical range, i.e. the memory of the APP1 is abnormal. That is to say, a current running environment of the terminal is unsuitable for APP1 to run. After determining that the APP1 is abnormal, the terminal may prompt the user that the memory of the APP1 is abnormal, and then the user may process the APP1 according to the prompt message.

It is to be illustrated that, 201' and 202' are alternative.

At S203', a temperature change state of the CPU may be monitored.

Specifically, the temperature change state of the CPU in the system resources may be monitored via a temperature sensor after the normal numerical range of consuming the system resource by each APP in each scenario from the server is received. The temperature change state of the CPU is related to a usage condition of the CPU, i.e. the temperature change state of the CPU is related to the consumed resources of the CPU while the APP is running.

At S204', an APP with a first CPU occupancy rate exceeding the corresponding normal numerical range may be searched for if it is monitored that a second CPU occupancy rate is also in an increase state upon monitoring that the temperature of the CPU is in an increase state, the APP searched may be determined as an APP that causes a temperature increase of the CPU, and the APP that causes the temperature increase of the CPU may be stopped using.

In the embodiment, if the temperature of the CPU is monitored to remain in the increase state all the time via the temperature sensor and the second CPU occupancy rate is monitored to be remain in the increase state as well, the APP with the first CPU occupancy rate exceeding the corresponding normal numerical range may be searched for, and then the APP searched may be determined as the APP that causes the temperature increase of the CPU, and the prompt message for prompting the user to stop usage may be shown thereon, such that the user may close or remove the APP that causes the temperature increase of the CPU according to the prompt message. If a plurality of APPs with the first CPU occupancy rate exceeding the corresponding normal numerical range are searched for, the terminal may sequence the APPs with the abnormal first CPU occupancy rate according to a condition of an increase of the CPU temperature while each APP is running and may show a sequence result to the user. The user may quickly focus on the APP that causes the highest temperature increase of the CPU according to the sequence result and may stop using the APPs at the same time according to the prompt message, also may stop using the APP that causes the temperature increase of the CPU according to demands, and also may remove the APP that causes the temperature increase of the CPU according to the prompt message.

Additionally, in the embodiment, the APP that causes the temperature increase of the CPU may be automatically closed or removed after the APP searched is determined as the APP that causes the temperature increase of the CPU.

In the embodiment, if the temperature of the CPU is monitored to remain in the increase state all the time except for a transient jump at a certain time point via the temperature sensor, the temperature change state of the CPU is also in the increase state. The jump may include two conditions: a jump of the temperature from high to low or a jump of the temperature from low to high.

For example, the temperature of the CPU is monitored to remain in the increase state all the time via the temperature sensor. The temperature change of the CPU of the terminal detected via the temperature sensor is shown in FIG. 3a if the user brings the terminal from outdoor with relatively low temperature to indoor with relatively high temperature. It is to be seen from FIG. 3a that, the temperature of the CPU remain in the increase state again all the time after a transient rapid increase (such as A in FIG. 3). The transient rapid increase of the temperature of the CPU mainly results from that the temperature of the environment including the terminal is from a low level to a high level. The temperature of the CPU remains in the increase state again all the time after the transient temperature increase, which may illustrate that the APP that causes the temperature increase of the CPU exists in the terminal. Then the APP with the first CPU occupancy rate exceeding the corresponding normal numerical range may be searched for, and the APP searched may be determined as the APP that causes the temperature increase of the CPU. The prompt message for prompting the user to stop usage may be shown on the terminal such that the user may stop using or remove the APP that causes the temperature increase of the CPU according to the prompt message, which may reduce an influence on the CPU from the APP that causes the temperature increase of the CPU, may lower the temperature of the CPU, and may avoid a case that the CPU is overheated.

For another example, the temperature of the CPU is monitored to remain in the increase state all the time via the temperature sensor. The temperature change of the CPU of the terminal detected via the temperature sensor is shown in FIG. 3b if the user brings the terminal from outdoor with relatively high temperature to indoor with relatively low temperature. It may be seen from FIG. 3b that, after the user brings the terminal from outdoor with relatively high temperature to indoor with relatively low temperature, the temperature of the CPU remains in the increase state again all the time after a transient rapid decline (such as B in FIG. 3b). The transient rapid decline of the temperature of the CPU results from that the temperature of the environment including the terminal is from a high level to a low level. The temperature of the CPU remains in the increase state again all the time after the transient rapid temperature decline, which may illustrate that the APP that causes the temperature increase of the CPU exists in the terminal. Then the APP with the first CPU occupancy rate exceeding the corresponding normal numerical range may be searched for and the APP searched may be determined as the APP that causes the temperature increase of the CPU. The prompt message for prompting the user to stop usage may be shown on the terminal such that the user may stop using or remove the APP that causes the temperature increase of the CPU according to the prompt message, which may reduce an influence on the CPU from the APP that causes the temperature increase of the CPU, may lower the temperature of the CPU, and may avoid a case that the CPU is overheated, thereby improving the experience of using the terminal by the user.

The terminal according to the embodiment, may monitor the temperature change of the CPU, may search for the APP with the first CPU occupancy rate exceeding the corresponding normal numerical range if it is monitored that the second CPU occupancy rate is also in the increase state upon monitoring that the temperature of the CPU is in the increase state, may determine the APP searched as the APP that causes the temperature increase of the CPU, and may stop using the APP that causes the temperature increase of the CPU, thereby reducing the influence on the terminal from the APP that causes the temperature increase of the CPU and avoiding a case that the CPU of the terminal is overheated.

In order to achieve the above embodiments, the present disclosure further provides a storage medium. The storage medium is configured to store an application for performing the method for processing an application according any one of embodiments of the disclosure.

In the description of the present disclosure, terms such as "an embodiment," "some embodiments," "an example," "a specific example," or "some examples," intends to mean that a particular feature, structure, material, or characteristic described in connection with the embodiment or example is included in at least one embodiment or example of the present disclosure. In the specification, the appearances of the above terms are not necessarily referring to the same embodiment or example of the present disclosure. Furthermore, the described particular features, structures, materials, or characteristics may be combined in any suitable manner in one or more embodiments or examples. In addition, by those skilled in the art that combinations and associations of embodiments, or examples, or features thereof can be made without departing from scope of the present disclosure.

Additionally, terms such as "first" and "second" are used herein for purposes of description and are not intended to indicate or imply relative importance or significance or implicitly imply quantities of the technique features. Therefore, the features limited with terms such as "first" and "second" may explicitly or implicitly include at least one feature. In the description of the present disclosure, "a plurality of" refers to at least two, such as two, three and the like unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which is to be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (Non exhaustiveness list) of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It is to be understood that, each part of the present disclosure may be realized by the hardware, software, firmware or combination thereof. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It is to be understood by those skilled in the art that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

Additionally, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although embodiments of the disclosure have been shown and described, it would be understood that, the above embodiments are exemplary and cannot be construed to limit the present disclosure, changes, alternatives, and modifications can be made by those skilled in the art in the embodiments without departing from scope of the present disclosure.

What is claimed is:

1. A method for processing an application, comprising:
   detecting an increase in a temperature of a central processing unit (CPU) over time using a temperature sensor;
   searching for an application with a first CPU occupancy rate exceeding a corresponding normal numerical range if it is detected that a second CPU occupancy rate is also in an increase state, wherein it is determined that the application is an application that causes a temperature increase of the CPU; and
   stopping the application that causes the temperature increase of the CPU;
   wherein before searching for the application with the first CPU occupancy rate exceeding the corresponding normal numerical range, the method further comprises:
      acquiring data of consuming a system resource by each of a plurality of applications and reporting the data to a server for each of a plurality of scenarios;
      calculating a normal numerical range of consuming the system resource by each application in each scenario based on the data; and
      receiving the normal numerical range of consuming the system resource by each application in each scenario from the server.

2. The method according to claim 1, wherein stopping the application that causes the temperature increase of the CPU comprises:
   displaying a prompt message for stopping usage of the application; and
   receiving an operation triggered by a user for closing or removing the application that causes the temperature increase of the CPU according to the prompt message and closing or removing the application that causes the temperature increase of the CPU according to the operation.

3. The method according to claim 1, wherein stopping the application that causes the temperature increase of the CPU comprises:
   automatically closing or removing the application that causes the temperature increase of the CPU.

4. The method according to claim 1, further comprising detecting a transient jump in the temperature of the CPU using the temperature sensor.

5. The method according to claim 4, wherein the transient jump comprises one of an increase in the temperature of the CPU and a decrease in the temperature of the CPU.

6. The method according to claim 1, wherein the normal numerical range of consuming the system resource by each application in each scenario comprises:
   a normal numerical range of consuming the system resource by each version of each application in each scenario.

7. The method according to claim 1, wherein the normal numerical range of consuming the system resource by each application in each scenario is acquired via the server by setting a weight for each kind of system resource based on a current scenario and by a calculation based on a corresponding weight.

8. The method according to claim 1, wherein the system resource comprises a center processing unit.

9. The method according to claim 1, wherein the scenarios are selected from the group consisting of an opened screen, a locked screen, a network connection state, and a network disconnection state, of a terminal installed with the application.

10. A terminal, comprising:
    a housing;
    a processor;
    a memory;
    a circuit board; and
    a power circuit;
    wherein:
       the circuit board is arranged inside a space enclosed by the housing;
       the processor and the memory are disposed on the circuit board;
       the power circuit is configured to provide power for one or more components of the circuit board;
       the memory is configured to store an executable program code; and
       the processor, by executing the executable program code stored in the memory, performs acts comprising:
          detecting an increase in a temperature of a central processing unit (CPU) over time using a temperature sensor;
          searching for an application with a first CPU occupancy rate exceeding a corresponding normal numerical range if it is detected that a second CPU occupancy rate is also in an increase state, wherein it is determined that the application is an application that causes a temperature increase of the CPU;

stopping the application that causes the temperature increase of the CPU; and before searching for the application with the first CPU occupancy rate exceeding the corresponding normal numerical range, the processor is further configured to perform acts of:

acquiring data of consuming a system resource by each of a plurality of applications and reporting the data to a server for each of a plurality of scenarios;

calculating a normal numerical range of consuming the system resource by each application in each scenario based on the data; and receiving the normal numerical range of consuming the system resource by each application in each scenario from the server.

11. The terminal according to claim 10, wherein the processor is configured to stop the application that causes the temperature increase of the CPU by acts of:

displaying a prompt message for stopping usage of the application;

receiving an operation triggered by a user for closing or removing the application that causes the temperature increase of the CPU according to the prompt message; and closing or removing the application that causes the temperature increase of the CPU according to the operation.

12. The terminal according to claim 10, wherein the processor is configured to stop the application that causes the temperature increase of the CPU by an act of:

automatically closing or removing the application that causes the temperature increase of the CPU.

13. The terminal according to claim 10, wherein the acts further comprise detecting a transient jump in the temperature of the CPU using the temperature sensor.

14. The terminal according to claim 10, wherein the normal numerical range of consuming the system resource by each application in each scenario comprises:

a normal numerical range of consuming the system resource by each version of each application in each scenario.

15. The terminal according to claim 10, wherein the normal numerical range of consuming the system resource by each application in each scenario is acquired via the server by setting a weight for each kind of system resource based on a current scenario and by a calculation based on a corresponding weight.

16. The terminal according to claim 10, wherein the system resource comprises a center processing unit.

17. The terminal according to claim 10, wherein the scenarios are selected from the group consisting of an opened screen, a locked screen, a network connection state, and a network disconnection state, of a terminal installed with the application.

18. A non-transitory computer storage medium comprising an application stored thereon, wherein the application comprises instructions, which, when executed by a processor, configure the processor to perform acts comprising:

detecting an increase in a temperature of a central processing unit (CPU) over time using a temperature sensor;

searching for an application with a first CPU occupancy rate exceeding a corresponding normal numerical range if it is detected that a second CPU occupancy rate is also in an increase state, whereby it is determined that the application is an application that causes a temperature increase of the CPU; and stopping the application that causes the temperature increase of the CPU;

wherein before searching for the application with the first CPU occupancy rate exceeding the corresponding normal numerical range, the processor is further configured to perform acts comprising:

acquiring data of consuming a system resource by each of a plurality of applications and reporting the data to a server for each of a plurality of scenarios;

calculating a normal numerical range of consuming the system resource by each application in each scenario based on the data; and receiving the normal numerical range of consuming the system resource by each application in each scenario from the server.

* * * * *